(12) United States Patent
Jenkins et al.

(10) Patent No.: US 6,206,534 B1
(45) Date of Patent: Mar. 27, 2001

(54) ILLUMINATION DEVICE FOR USE IN IMAGE READING APPLICATIONS

(75) Inventors: David Jenkins; Mark Kaminiski, both of Tuscon, AZ (US)

(73) Assignee: CMOS Sensor, Inc., Cupertino, CA (US)

( * ) Notice: Subject to any disclaimer, the term of this patent is extended or adjusted under 35 U.S.C. 154(b) by 0 days.

(21) Appl. No.: 09/289,314

(22) Filed: Apr. 9, 1999

(51) Int. Cl.[7] .................................................. F21V 8/00
(52) U.S. Cl. ............................. 362/31; 362/27; 362/551; 362/555; 362/559; 362/560; 362/583
(58) Field of Search ........................... 362/31, 27, 551, 362/555, 559, 560, 583, 230, 231

(56) References Cited

U.S. PATENT DOCUMENTS

| | | | |
|---|---|---|---|
| 5,810,463 | * 9/1998 | Kawahara et al. | 362/31 |
| 5,850,585 | * 12/1998 | Tsutsumi et al. | 399/128 |
| 5,921,652 | * 6/1999 | Parker et al. | 362/31 |
| 6,036,340 | * 3/2000 | Fohl et al. | 362/511 |

* cited by examiner

Primary Examiner—Thomas M. Sember
Assistant Examiner—Ismael Negron
(74) Attorney, Agent, or Firm—Pacific Law Group LLP; Chi Ping Chang

(57) ABSTRACT

This invention discloses an illumination device for use in image reading applications. The illumination device comprises a light guide and a light source attached to one end of the light guide, which consists of a rod-shaped body with two end light reflectors made of metal clips. The two lateral surfaces of the light guide causes total internal reflection of light rays impinging upon the surface from within the light guide. The curved top surface of the light guide serves the function of focusing. The narrow bottom surface along the light guide reflects the light with a series of highly reflective paint stripes of varying widths applied upon it. The light source comprises a plurality of light emitting elements and at least a center of the light emitting elements is placed along a normal line passing through a center of the reflection area when viewed in a longitudinal direction of the light guide. A light beam applied from the light source is scattered and reflected by a scatter and reflection area of the light guide to illuminate an original document.

29 Claims, 12 Drawing Sheets

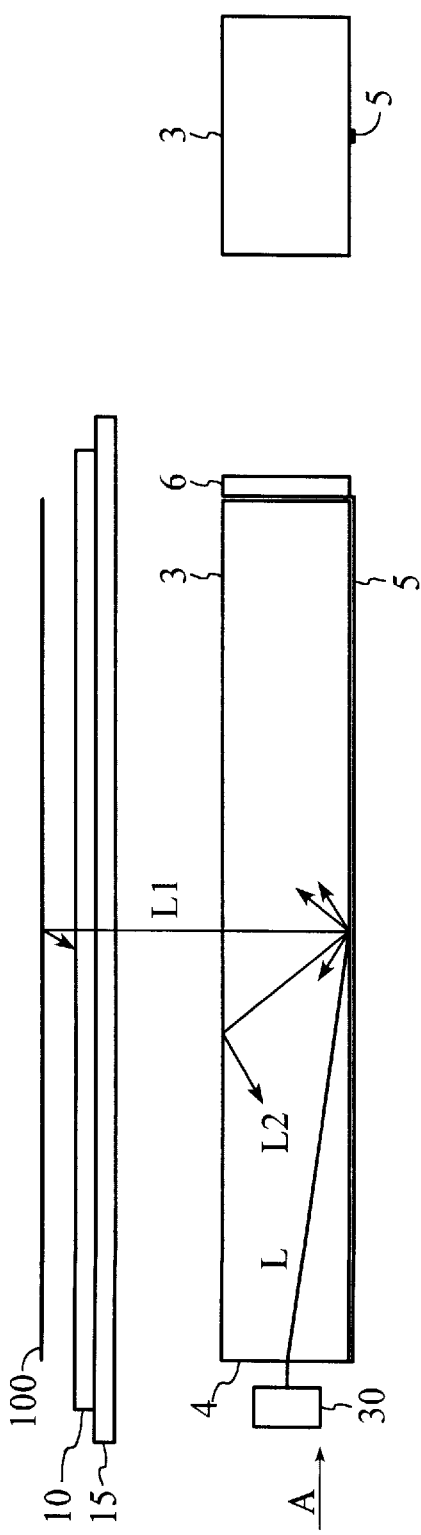
FIG. 2A (PRIOR ART)
FIG. 2B (PRIOR ART)
FIG. 2C (PRIOR ART)

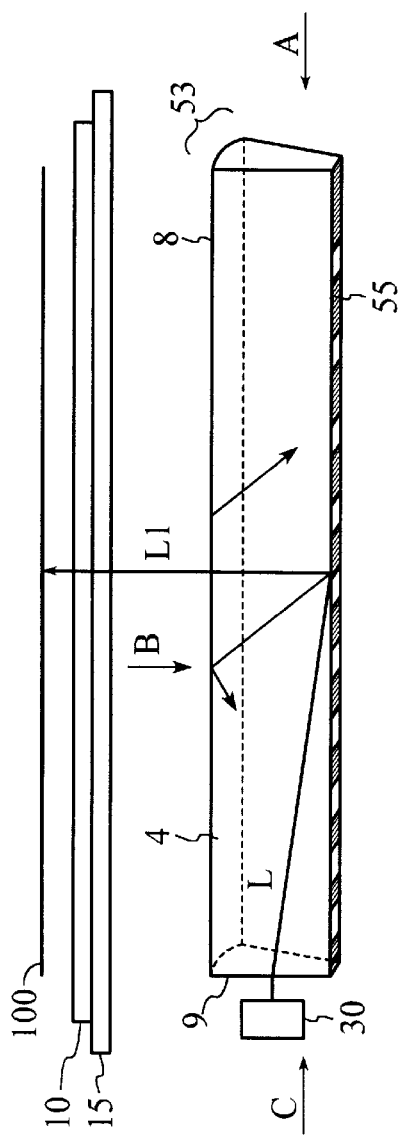
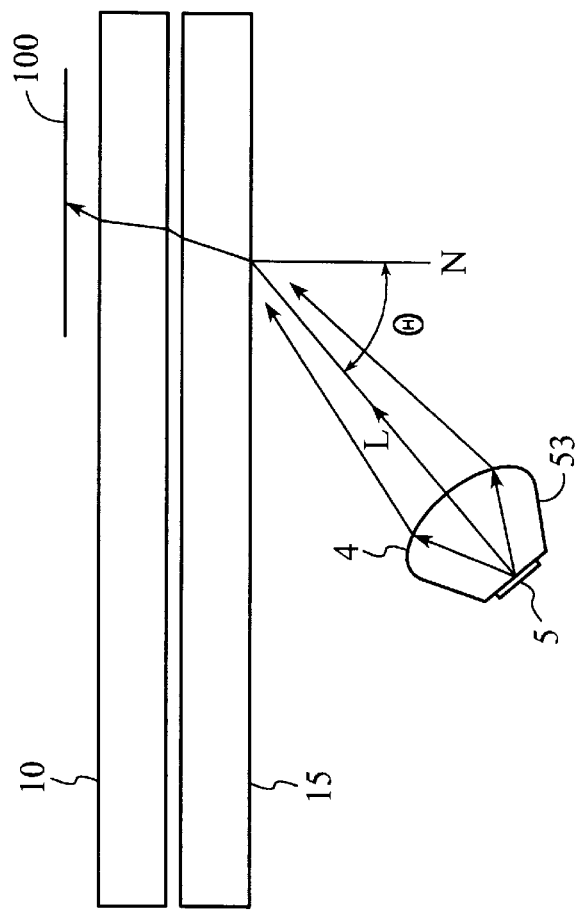
FIG. 3A
FIG. 3B

ILLUMINATION DEVICE FOR USE IN IMAGE READING APPLICATIONS

BACKGROUND OF THE INVENTION

1. Field of the Invention

The present invention relates to an illumination device. More particularly, the present invention relates to an illumination device having a light guide to provide uniform illumination to a target as used in an image reading apparatus such as copying apparatus, facsimile apparatus, scanner and electronic blackboard.

2. Related Background Art

A variety of image reading apparatus having various types of illumination devices have been proposed for image input and conversion of an original document into image signals. For example, U.S. Pat. Nos. 5,808,295 and 5,499,112 disclosed a reading apparatus of an information processing system such as a scanner as shown in FIGS. 1A to 1C, in which Light Emitting Diodes (LEDs) are used to light up the front end of a long, thin light guide that creates a narrow strip of light on a paper target scanned by a linear imaging system.

Referring to FIGS. 1A to 1C, a preferred embodiment of the prior art illumination device is discussed. Numeral 100 denotes the read position of an original, numeral 10 denotes a light transmissive sensor substrate on which a plurality of photo-electric conversion elements formed by using a thin film semiconductor layer are arranged in one dimension. The light transmissive sensor substrate 10 is packaged on a light transmissive packaging substrate 15 by bonding and is electrically connected with a drive circuit. Numeral 30 denotes an illumination means (light source) which comprises LED light sources. Numeral 3 denotes a light transmissive member such as Acrylic, having a 5-sided cross-section as shown in FIG. 1B, the tilted side, which is a 45-degree planar surface that intersects the left side and top side, is named as the illuminating face. The topside is also called top face, and the left side, right side, top face and bottom side would make a rectangle without the intersection of the illuminating face. Numeral 4 denotes the illuminating face. Numeral 9 denotes an incident plane through which a light beam emitted from the illumination means 30 is applied to the illuminating face 4 and top face, and numeral 5 denotes a scatter and reflection area for scattering and reflecting the light beam. The scatter and reflection area 5 is formed by applying light diffusion reflective paint. Numeral 20 denotes a white plastic holder that surrounds all sides of the light guide except incident plane 9, top face and illuminating face 4.

A light beam L emitted from the LEDs in light source 30 enters the light transmissive member 3 from the incident plane 9 of the light transmissive member 3 and repeatedly reflected via the process of total internal reflection ("TIR") at the inner surface of the light transmissive member 3 and propagates therein, until finally reaches the opposite plane to the incident plane 9, where it is again reflected and propagates in the light transmissive member 3. While propagating down the length of the light transmissive member 3, some light reaches the scatter and reflection area 5 where it is diffused and a portion L1 as shown in FIG. 1A and FIG. 1C, is emitted out of the illuminating face 4 located opposing area 5 with an 45-degree angle and it passes through the light transmissive packaging substrate 15 and the illumination window in the light transmissive sensor substrate 10 and irradiates the document sheet located at the read position of an original 100. Another portion L2 as shown in FIG. 1C, of the diffused light beam is directed to the top face and exits. Still another portion L3, as shown in FIG. 1C of the diffused light beam, is directed to the exit plane obliquely so that it is totally reflected as shown as L4 in FIG. 1C of the reflected light beam to exit the illuminating face 4, and another portion L5 as shown in FIG. 1C, of the reflected light beam is again directed to the top face and exits, and some portion of L3 may pass through light transmissive member 3 and hit white plastic holder and bounce back into light transmissive member 3 after suffering an approximately 10% loss, then propagates along with the rest of the reflected light beam in the light transmissive member 3, it repeats the propagation and finally reaches the incident plane 9 where it is emitted out.

The light beam which irradiates the document sheet 100 is reflected by the document sheet 100 and directed to the photo-electric conversion elements on the light transmissive sensor substrate 10 where it is photoelectrically converted to produce an image read signal which is outputed to an external device.

In the example described above, the device may be an efficient extractor of light, but it has some significant problems in regards to its ability to couple the light efficiently with the imaging system. Since the imaging system only receives an extremely narrow line on the scanned paper at any given time came out of the illuminating face 4, the best illumination device should be provided with an illuminating face capable of focusing a scattered light onto the target paper to form a very narrow line. The device as disclosed apparently lacks such ability because the illuminating face of the aforementioned light guide is flat.

The aforementioned devices are further disadvantaged with several more notable problems. First, a large percentage of light leaks out of the top of the light guide as indicated as L2 and L5 in FIG. 1C. Second, the paint stripe surface 5 is not perpendicular to the aim direction of the illuminating face, reducing the amount of directly scattered light out of the light guide towards the center of the target. Thirdly, a white plastic holder that covers substantially the entire surfaces of the light guide except for the top illumination surface contributes further to the loss of light because of absorption of the light by the plastics. As a result of these arrangements, the device as disclosed relies significantly on indirect scatter, which is a less efficient way to illuminate the paper target and widens the illumination pattern.

Referring to FIGS. 2A to 2C, there is shown a perspective view of an additional embodiment of the prior art illumination system. In particular, in FIGS. 2A to 2C, numeral 30 denotes a light source which comprises LED chips 81G and 81R which are light emitting elements having different light emission wavelength ranges. The read position of the document sheet 100, the position of an illumination window and an optical axis along the array direction of the scatter and reflection area 5 of the light transmissive member 3 are set such that they are in a normal plane passing through the read position of the document sheet 100. The light beam L emitted from the LED chips 81G and 81R is scattered and reflected by the scatter and reflection area 5 and a portion L1, of the light beam goes out of the light transmissive member 3, passes through the illumination window to illuminate the original 100. Another portion L2, of the scattered and reflected light beam further propagates through the light transmissive member 3.

In this example, centers of the LED chips 81G and 81R of the respective light emission wavelength ranges of the light source 30 are deviated from a normal line passing through the center of the scatter and reflection area 5, By arranging the light source in this manner, better illumination uniformity along the light guide is achieved, and the high color discrimination ability and multi-tone output image are attained without providing an illumination compensation circuit is produced. In this example, the paint stripe, the scatter and reflection area 5 in FIGS. 2A to 2C, is aligned perpendicular to the aim direction and consequently improved illumination efficiency over the previous example. But the rectangular cross-section of the light guide, which determines the top face of the light guide through which portion L1 of the reflected and scattered light beam travel to the target, is still flat, thus still lacking the ability to focus the light scattered from the paint stripe onto the target.

In addition, while the device as disclosed achieves better illumination uniformity along the light guide by placing the centers of the LED chips 81G and 81R deviated from the normal line, it nevertheless suffers substantial drawbacks as, by its design, it imposes a significant limitation as to the physical location as well as the number of the LED chips permissible on the light guide without compromising illumination uniformity. According to this design, the placement of a third LED chip such as the Blue chip would be difficult, if is not impossible, without compromising its illumination uniformity.

There is therefore an apparent need for an illumination device that has an illumination face capable of forming a focused illumination on the target paper to produce a very narrow line and reduces undesirable light loss from the non-illuminating faces of the light guide, increasing its ability to couple the light efficiently with the imaging system.

There is a further need for an illumination device that can provide greater flexibility as to the placement of LED chip and permits more LED chips without compromising its ability to achieve illumination uniformity along the light guide.

In particular, there is a need for an illumination device to achieve better illumination uniformity along the light guide without the necessity of deviating a center of the LED chips of the respective light emission wavelength ranges of the light source from a normal line passing through the center of the scatter and reflection area.

Accordingly, it is an object of the present invention to provide an illumination device which has an improved light extraction efficiency through better light guide geometry, providing a highly uniform illumination on a target and does not suffer any aforementioned setbacks.

It is another object of the present invention to provide an illumination device to achieve better illumination uniformity along the light guide where LED placement does not have to deviate from the normal line passing through the center of the scatter and reflection area.

SUMMARY OF THE INVENTION

The present invention relates to an illumination device having a light guide to provide uniform illumination to a target as used in an image reading apparatus. One aspect of the invention is to provide for an illumination device comprising a light guide to receive a light beam emitted from an illumination means through a light entrance at an end of the light guide adjacent to the illumination means. The illumination device further comprises a mounting means that is arranged adjacent to the light entrance for the purpose of retarding part of the light beam emitted from a Red LED before it is reflected at a reflection area of said light guide so as to prevent initial spikes and dips.

Another aspect of the invention is to provided for an illumination means comprising at least three light emitting elements of different light emission wavelength ranges and at least a center of one of the three light emitting elements is placed along a normal line passing through a center of the reflection area when viewed in a longitudinal direction of said light guide. Due to the inclusion of the mounting means in the light guide in a position adjacent to the light entrance, the otherwise undesirable initial spikes and dips that may be caused by the placement of the Red LED along the center a normal line passing through a center of the reflection area are substantially eliminated according to the invention.

Still another aspect of the invention is to provided for a rod shaped light guide having a substantially symmetric cross section that remains unchanged down the length of light guide, allowing light to propagate via the TIR down the entire length of the light guide. A curved light exit face is also provided to perform focused illumination to a target original to form a narrow line on the target original. The light guide according to the invention further comprises a reflection means arranged at a second end of the light guide opposite to the light entrance, allowing light to make a second pass backwards over the entire length of the light guide.

Still another aspect of the invention is to provide for a reflection area that is formed by a light reflective paint along a longitudinal direction of the light guide in which the paint intensity of the light reflective paint is increased as the location of the reflection area is farther away from the illumination means so that the light intensity reflected by the reflection area is substantially constant along the length of the light guide.

Still another aspect of the invention is to provided an illumination device capable of forming a "virtual paint strip" on the total internal reflection sidewall. This is achieved by allowing the light beam reflected from the reflection area to be redirected to the illumination face after reflecting on one of the two total internal reflection sidewalls. As such, the "virtual paint strip" will form on the sidewall as if they were emitted from an imaginary paint stripe and consequently the virtual width of the light reflective paint is larger than its physical width and increase light output through the illumination face.

BRIEF DESCRIPTION OF THE DRAWINGS

FIGS. 2A, 2B and 2C show another prior art illumination devices with light guide having a rectangular cross-section and the light source having its light emitting elements of different light emission wavelength ranges separated;

FIGS. 3A and 3B show an illumination device according to first embodiment of the present invention;

DETAILED DESCRIPTION OF THE PREFERRED EMBODIMENTS

Figure 1A:
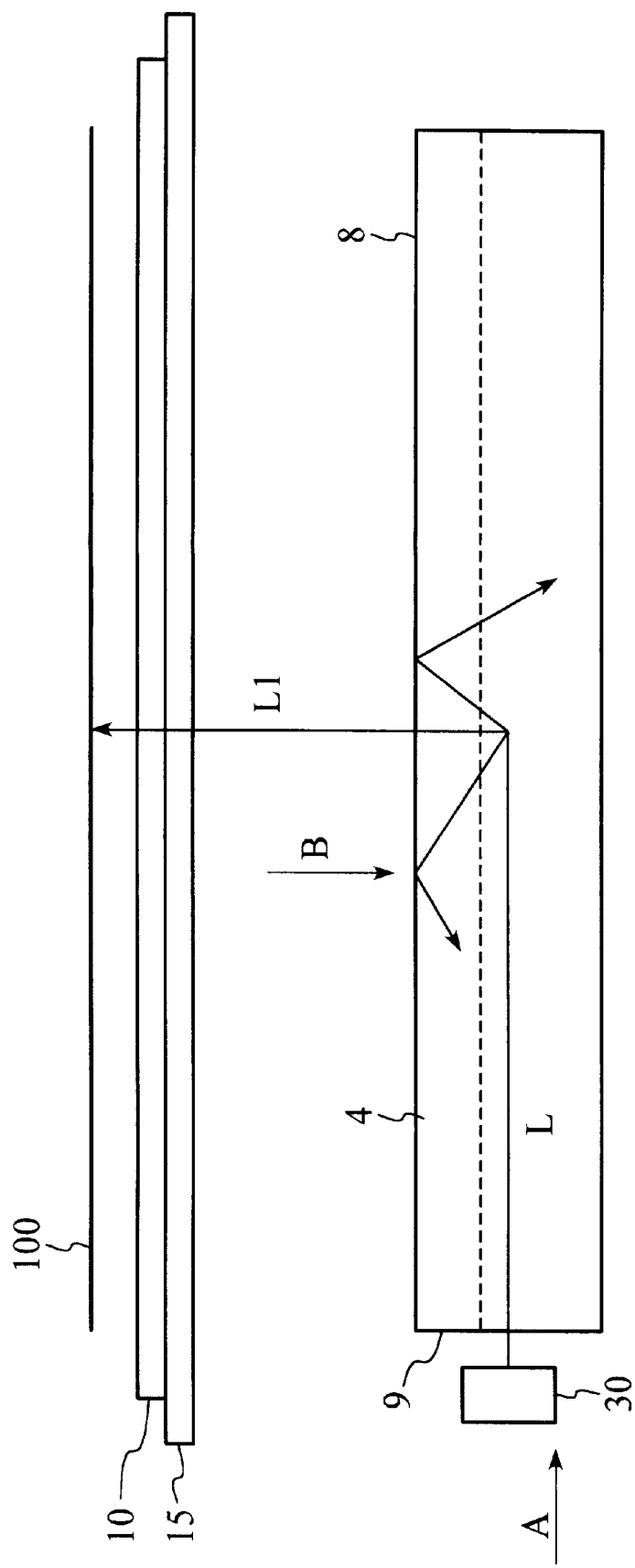
FIGS. 1A, 1B and 1C show a prior art illumination devices with light guide having a pentagon cross-section.
Figure 1B:
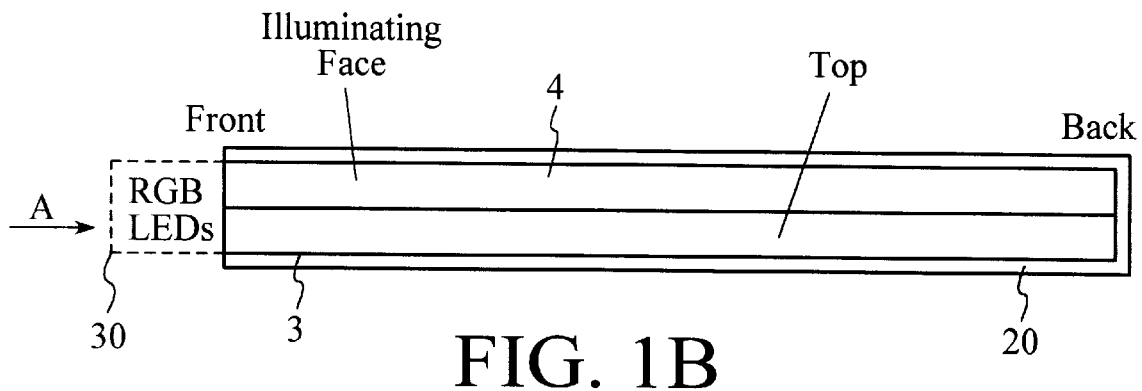
Figure 1C:
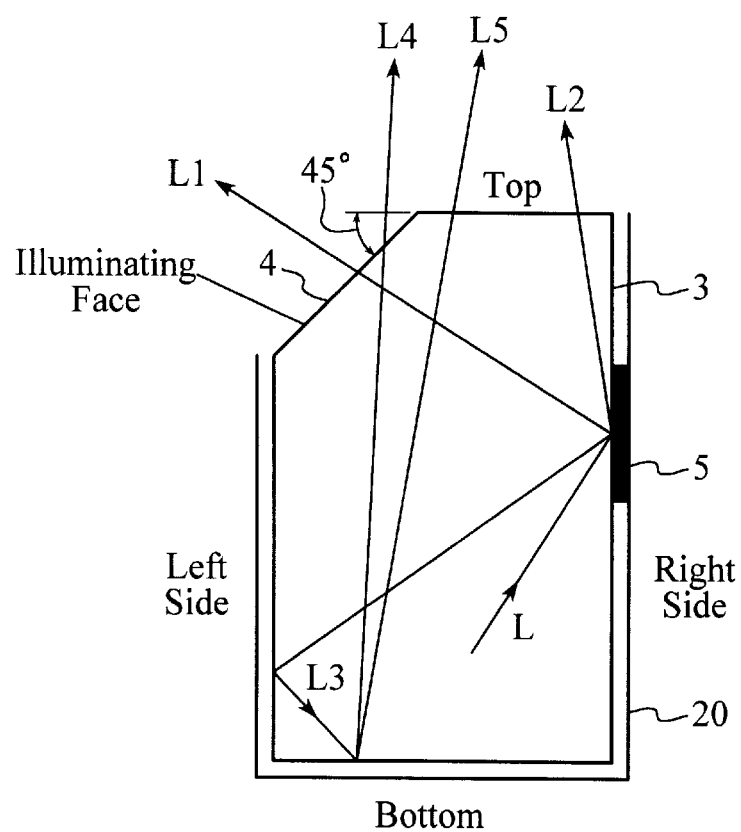

With a flat illumination face, neither the illumination device with a light guide having a 5-sided cross-section nor the one with a light guide having a rectangular cross-section in the above prior art examples has provided any special design features on further improving the focusing of the illuminating light output from the light guide, thus improving the coupling between the illuminating light and the imaging system and consequently improving resolution of the image reading.

Thus, in the present invention, a new geometry light guide is disclosed which is specially designed to significantly improve the focusing of the output illuminating light, yet at the same time to achieve simplicity by having fewer components. Further, the accompanying light source is also redesigned with separate light emitting elements having different light emission wavelength ranges.

The preferred embodiments of the present invention are now explained in conjunction with the drawings. Referring to FIG. 3, there is shown a preferred embodiment of the image reading apparatus of the present invention. FIG. 3A shows a sectional view of a photo-electric conversion element array of the image reading apparatus as viewed along a main scan direction, and FIG. 3B shows a sectional view of the photo-electric conversion element array of the image reading apparatus as viewed along a sub-scan direction that is along arrow A in FIG. 3A.

In FIGS. 3A to 3B, numeral 10 denotes a light transmissive sensor substrate on which a plurality of photo-electric conversion elements formed by using a thin film semiconductor layer such as amorphous silicon or polycrystalline silicon are arranged in one dimension. A protective layer, not shown, is formed on the light transmissive sensor substrate 10 to protect the photoelectric conversion elements, not shown, from damage by movement relative to a document sheet.

The light transmissive sensor substrate 10 is packaged on a light transmissive packaging substrate 15 by bonding, and is electrically connected to a drive circuit, not shown, packaged thereon by wire bonding. Numeral 100 denotes the read position of the document sheet, also called an original target.

Numeral 53 denotes a light conductor or light guide made of a light transmissive member having a rod like cross-section shown in FIG. 3B. Numeral 30 denotes a light source whose light emitting elements can have up to three different light emission wavelength ranges. Numeral 4 denotes the curved part of the light transmissive member 3, also called illumination face, through which the light will get out of the light guard 53 and get focused toward the target 100.

In order to reflect the light beam, a scatter and reflection area 5 is formed on a plane facing the illumination face 4 by roughening the surface of the light transmissive member 3 or applying light diffusion and reflective paint.

As discussed above, a prior art light guide having a pentagon cross-section was examined, in spite of the significant light loss through the top and reflection on white plastic holder, the width of the illuminating light which output through the illumination face is approximately 4 mm, while only 0.5 mm is needed by the imaging reading system. In the present embodiment, as shown in FIG. 3B, the curved illumination face 4 focuses light rays reflected and scattered from the scatter and reflection area 5 into a narrow stripe when they get out of the light transmissive member 3 though the illumination face 4. Thus the illumination intensity is greatly enhanced without changing light extraction efficiency. The rod like cross-section of the light transmissive member 3 is symmetric along central illumination line L. The symmetric cross-section and the central illumination line L is tilted toward and aimed at the target paper (at an angle θ with perpendicular direction N) for a reason that will be explained later. FIG. 3B shows that the portion of the lights reflected and scattered from the paint stripe 5, which is directed toward the illumination face 4, get out of the light transmissive member 3 focused to the target 100

Figure 4:
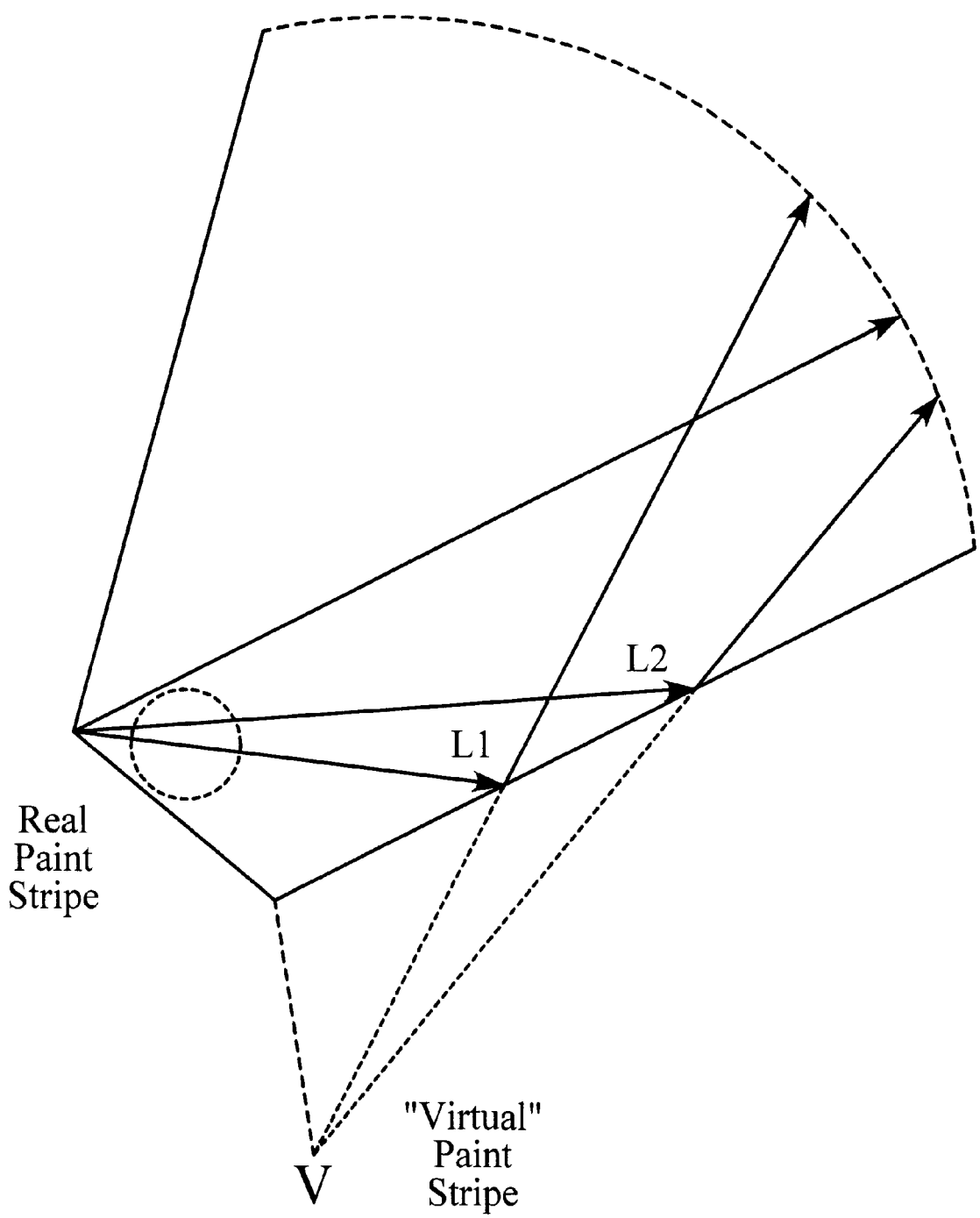
FIG. 4 shows a curved illumination face of the illumination devices according to first embodiment of the present invention.

Referring now to FIG. 4, the light focusing mechanism according to the invention will be explained in detail. FIG. 4, which presents a closer look of the light guide cross-section, shows that a portion of the light rays that are directed toward the side wall of the light guide, namely light L1 and L2, will be experiencing a total internal reflection, TIR in short, and are redirect towards the illumination face 4. Thus, the design provided by the present invention uses a curved illumination face 4 to focus light onto a narrow strip. If the width of the illumination strip can be halved without changing efficiency, then the flux available for the imaging system will be doubled. To focus light onto a smaller strip on the target 100, the size of the paint stripe 5 should be narrow as possible and constant along the length of the light guide. The extraction efficiency depends on the ratio of the paint stripe's width to the light guide's width. Thus, the light guide cross-sectional area should be as small as possible to maximize performance. However, It should be noted that the width of the paint stripe 5 corresponds directly to the illumination intensity on the target 100, the size of the paint strip 5 can not be too narrow to provide insufficient illumination intensity.

The aforementioned challenge is resolved by the present invention by forming a "virtual paint strip" on the sidewall of TIR. When L1 and L2 were redirected to the illumination face 4 after reflecting on the sidewall, in effect, they were as if emitted from an imaginary paint stripe point V as shown in FIG. 4, and consequently the virtual width of the paint stripe 5 is larger than its physical width. Since the width of the paint stripe 5 relates to the illumination intensity on the target, the present invention uses a narrower paint stripe 5 to achieve the same the illumination intensity on the target 100. To match the narrower paint stripe width, the light guide cross-sectional area is smaller, reducing building materials substantially.

Figure 5A:
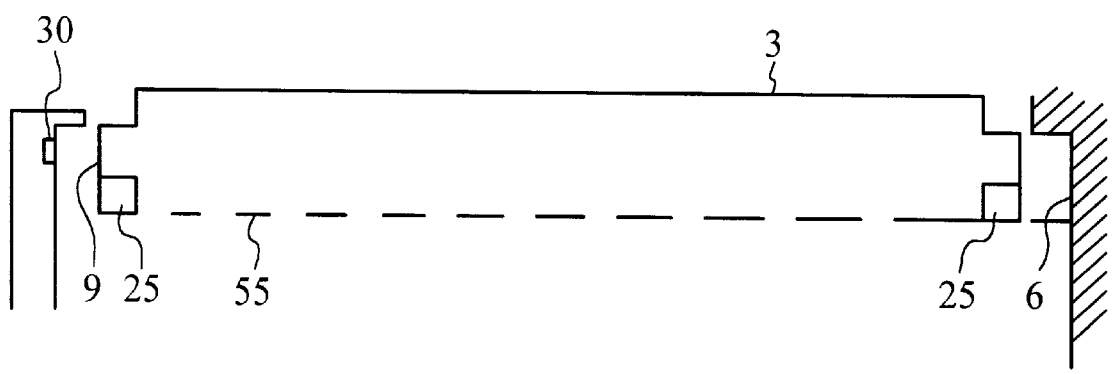
FIGS. 5A and B show a light guide according to the present invention.
Figure 5B:
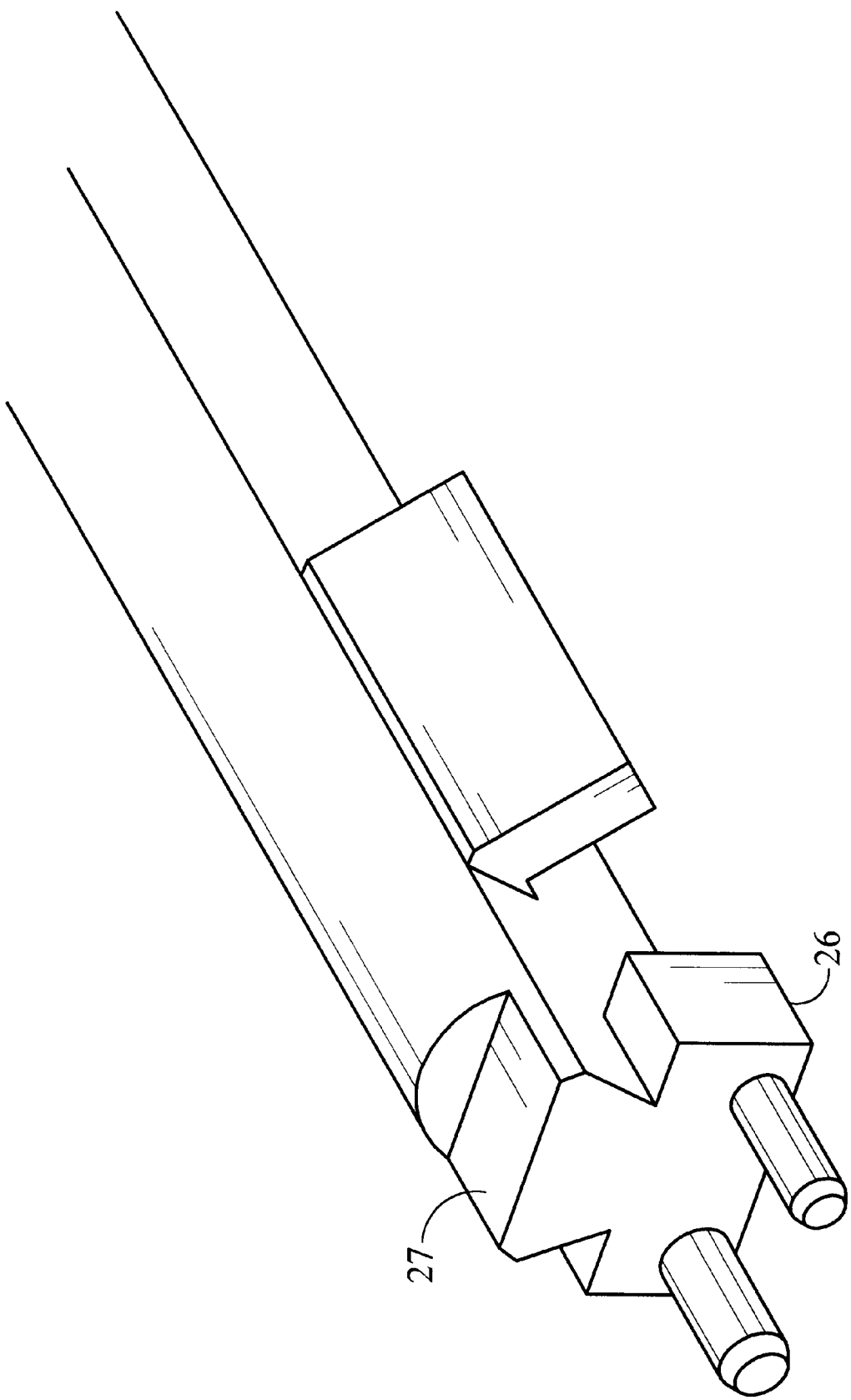

Referring to FIGS. 5A to 5B, the light guide according to the present invention is now discussed. FIG. 5A is a schematic drawing showing a sectional view of the light guide body viewed from the main scan direction. Numeral 30 denotes a light source. Numeral 3 denotes the light transmissive member. Numeral 5 denotes a paint stripe, which is the scatter and reflection area. Numeral 25 denotes two mounting tabs that are built in the light guide. Numeral 6 denotes a metal end clip.

Light emitted from light source 30 enters light transmissive member 3 through an incident plane 9 and bounces using TIR until it scatters off the paint stripe 5 out of light transmissive member 3 and is focused to the target as described above, the rest of the light beam remaining in light transmissive member 3 propagates along the length until it reaches the end of the light guide, where the metal end clip 6 reflects light and it heads back through the light guide towards the incident plane and has a second chance to scatter off the paint stripes as described above. Only those light rays that survives the second round extraction and reaches the incident plane, which is rare, leak out of the light transmissive member 3 and are lost.

Figure 6A:
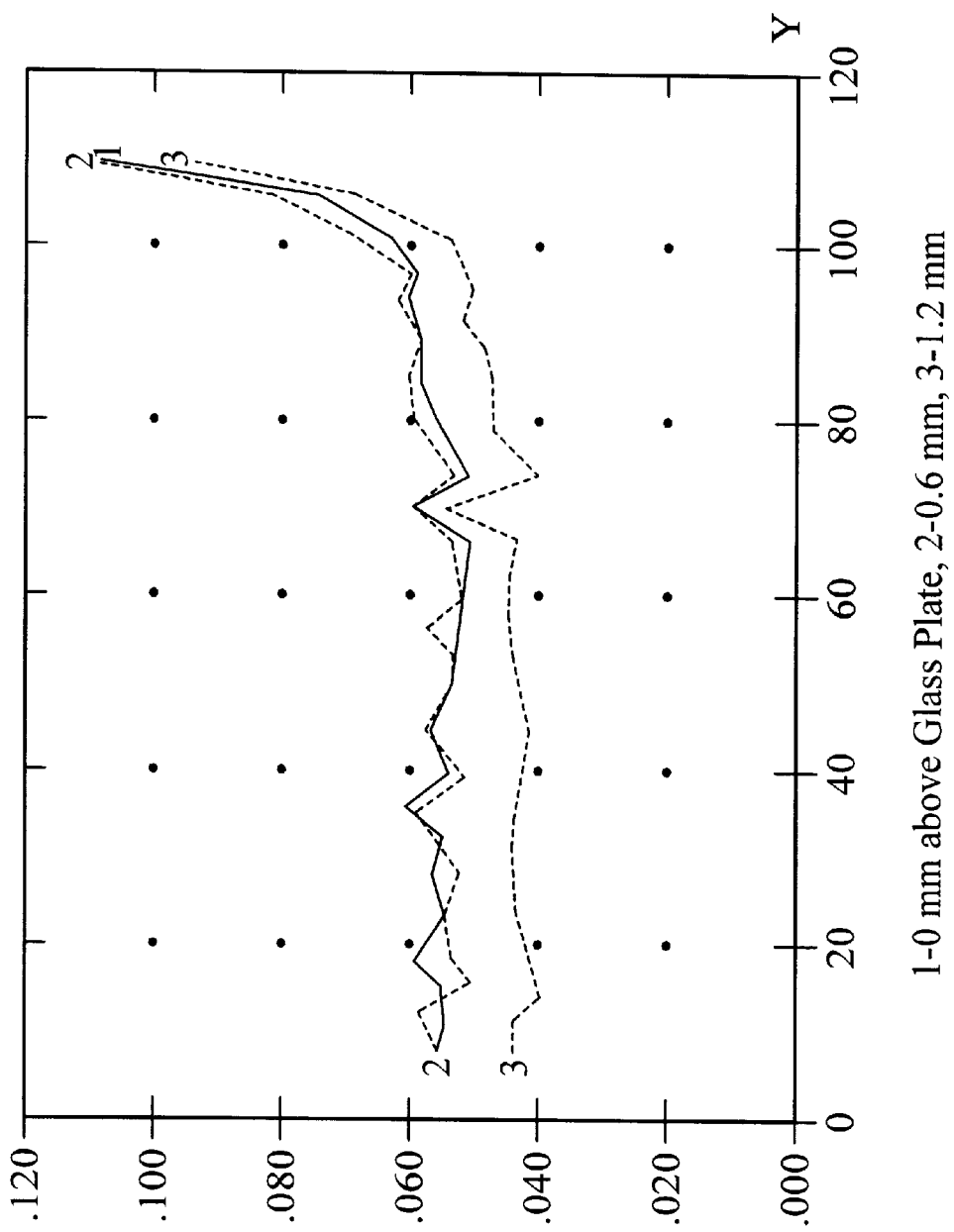
FIGS. 6A and 6B show a comparison of illumination performance between prior art light guide and the present invention.

For comparisons, the prior art design adopts direct painting of one end of the light guide as shown as the reflection area 6 in FIG. 2A. Direct painting the end of the light guide will cause a spike at the end of the illumination pattern as shown in FIG. 6A. In FIG. 6A, the X-axis marks the distance from the incident plane 9 along the light guide, where distance 120 is the end of the light guide. The Y-axis marks the relative illumination on target, the solid line represents the relative illumination of red light wavelength range (center light emission wavelength 650 am, half value 30 am) at different distance from the incident plane. The two dotted lines represent the relative illuminations of green and blue light wavelength at different distances from the incident plane respectively.

Figure 6B:
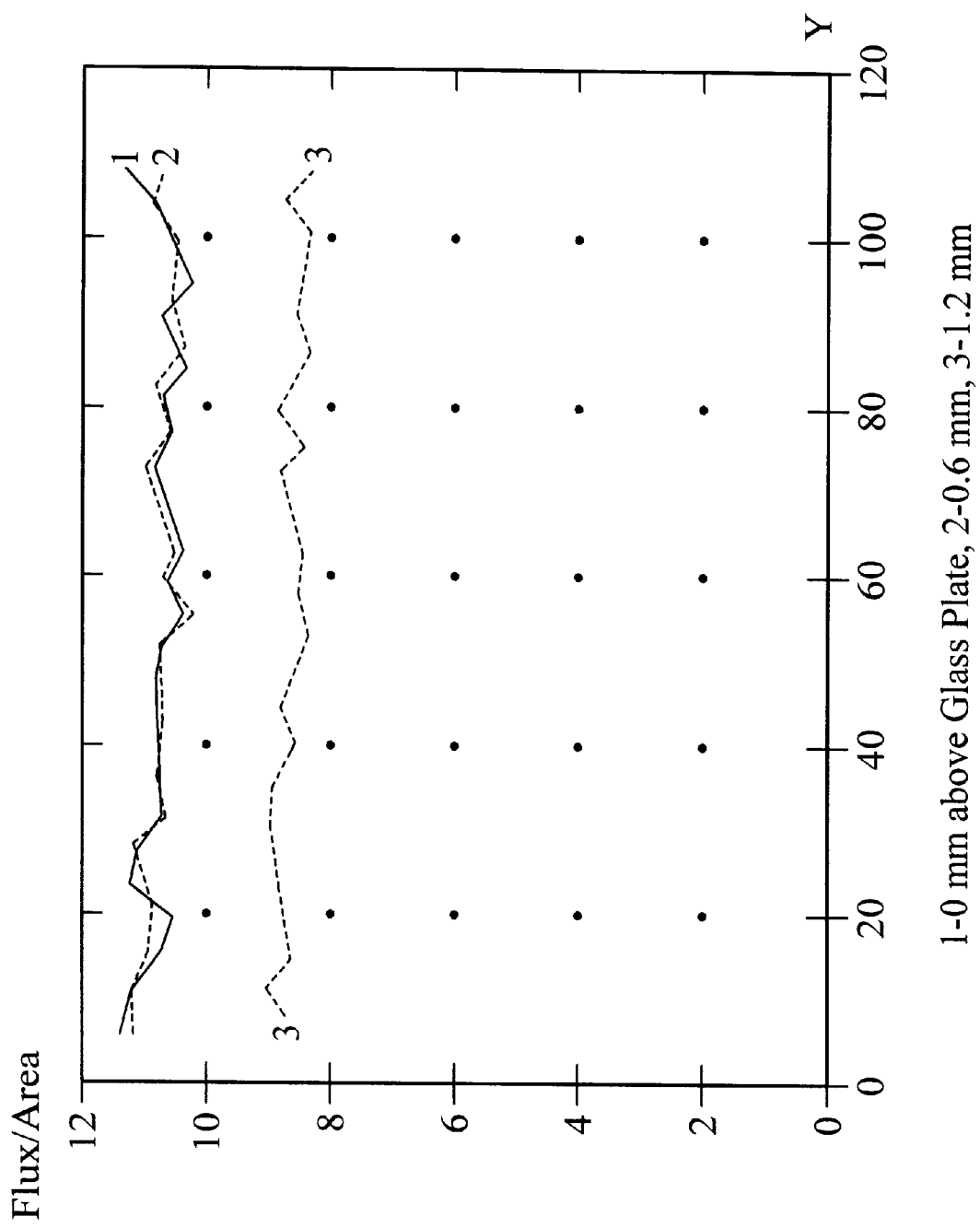

The resulting relative illumination over different location along the light guide for the present invention is shown in FIG. 6B. In FIG. 6B, again the X-axis marks the distance from the incident plane 9 along the light guide, where distance 120 is the end of the light guide. The Y-axis marks the relative illumination at target, the solid line represents the relative illumination of red light wavelength range (center light emission wavelength 650 am, half value 30 am) at different distance from the incident plane. The two dotted lines represent the relative illuminations of green and blue light wavelength at different distance from the incident plane respectively. It is clear that the spike between distance 100 to 110 in the prior art FIG. 6A is eliminated in the present invention shown in FIG. 6B.

The metal end clip 6 also holds the light transmissive member 3 at the end of the light guide but allows space for thermal expansion over the storage temperature range. In addition, the metal end clip 6 in FIG. 5A can be replaced by a white plastic end clip as well, suffering only an approximately 10% loss of light in reflection while saving significant cost on material.

By comparing FIG. 6A and FIG. 6B, improvement in uniformity along the light guide according to the present invention becomes apparent. One important factor that contributes to this improvement in uniformity is the special design of the painting stripe in the present invention. As light emitted from the light source 30 and enters the light transmissive member 3 through incident plane 9, the light extraction from the light guide tends to decrease along the length of the light guide. As a result, the light extraction and losses along the way will reduce the light flux intensity of the light beam as it travels further away from the incident plane 9. In the present invention, the paint intensity of the paint stripe 5 increases as distance from the incident plane 9 increases, allowing the uniformity of the light extraction out of light transmissive member 3 through illumination face 4 along the light guide.

The mounting tabs 25 in FIG. 5A are built into the front and end of the light guide, decreasing the number of components and simplifying the structure of the system. As shown in FIG. 5B, the mounting tabs 25 have a pair of high wings 26 that attach at the bottom of the cross-sectional portion of the light guide. Notches 27 are cut out of the light guide near the curved illumination face. The wings 26 at the bottom of the mount prevent an initial spike that arises from too much light from the Red LED hitting the paint stripe directly. The notch 27 on the top prevents the curved illumination face from focusing light from the Green and Blue LEDs onto the paint stripe to eliminate dips and spikes. In addition, with the two mounting tabs at each end of the light guide in place, the light is given a distance to propagate right after it enters the light guide through the incident plane 9 or right after it is reflected on the metal end clip 6 and heading back, this will further eliminate spikes that tend to be generated at both ends of the light guide. The mounting pole on each wing is not optically active and can be altered.

The inclusion of the mounting tabs 25 as an integral part of the light guide should further improve uniformity in two ways. First, the LED light is given a distance to propagate and this will cause the LED patterns to blur and fill up more of the light guide. Second, the top and the bottom of the mounting tabs are removed. Thus, light from the LEDs is allowed to spread out, but the TIR prevents it from coming too near to the curved lens or paint stripe. The mounting tab design minimizes spikes and dip at the start. The Red LED may lose some light initially, but this is not a major problem because Red LEDs are usually much brighter than Green and Blue LEDs.

The employment of the mounting tabs 25 to minimize spikes and dips at the start provides a unique opportunity to construct a light guide with greater flexibility for LED placement in relation to the physical location of the LED light source without compromising the uniformity of light output from the light guide as will be discussed below.

In the prior art illumination device of FIG. 2B, it is required that centers of the LED chips 81G and 81R of the respective light emission wavelength ranges of the light source 30 be deviated from a normal line passing through the center of the scatter and reflection area 5. More particularly, the prior art disfavors and, in fact, prohibits the placement of an LED directly on or in any physical proximity to a line normal to the paint stripe. While this arrangement allows the prior art device to eliminate an initial spike at the beginning when retaining illumination uniformity along the light guide, it undesirably limits the physical location and number of the LEDs that may be placed in the light source 30.

Figure 7:
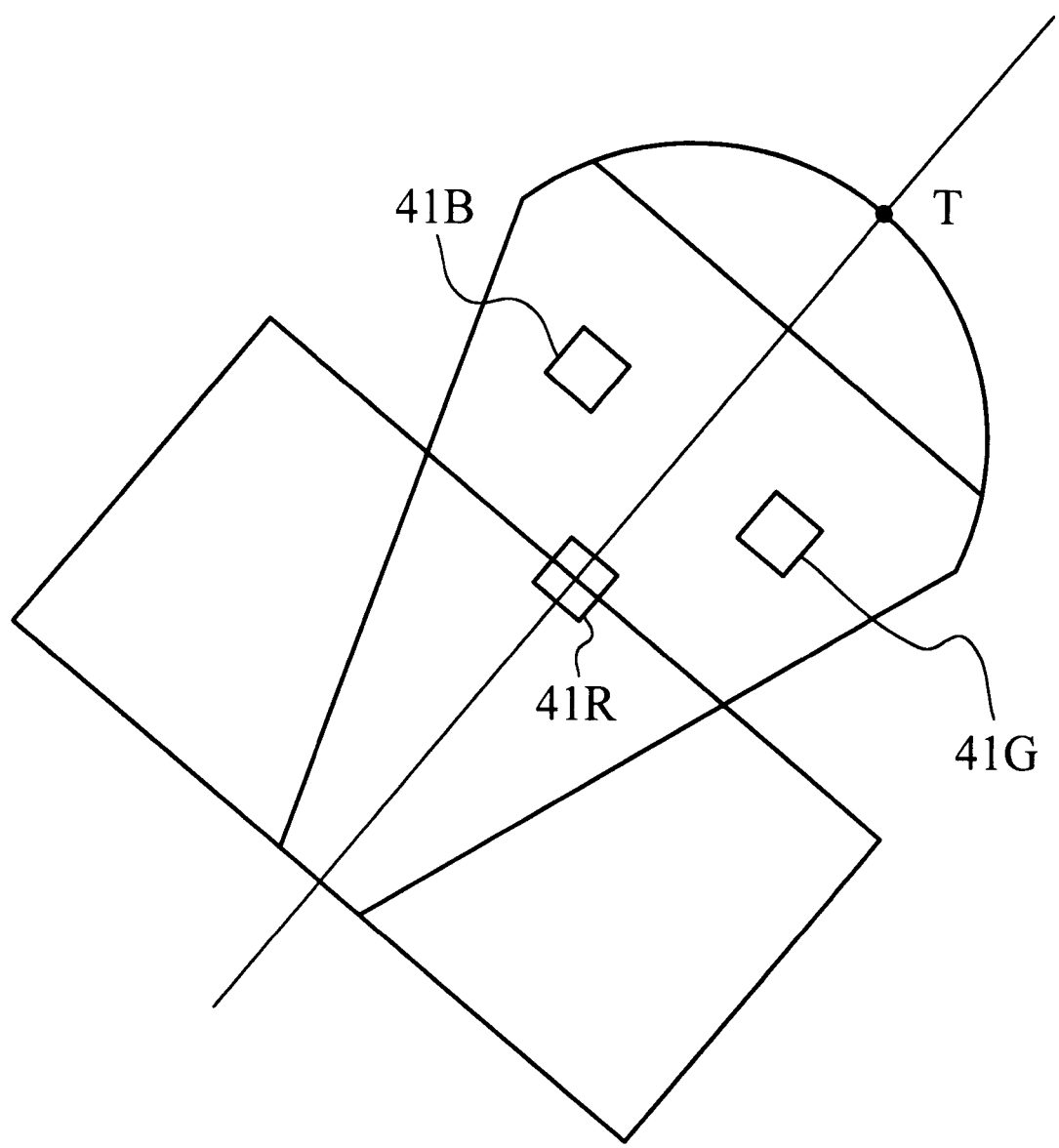
FIG. 7 shows the placement of the R, B and G LED chips on the illumination devices according to the present invention.

Contrary to the prior art, the present invention now describes an illumination device having a RED LED placed along the line normal to the paint stripe yet achieving and retaining illumination uniformity along the light guide due to the inclusion of the mounting tabs 25. Referring now jointly to FIG. 3A, FIG. 3B, FIG. 5A and FIG. 7, the LED placement according to the present invention is discussed. Numeral 30 in FIG. 3A and FIG. 5A denotes the light source. FIG. 7 is a schematic drawing of the light source 30 as illustrated in FIG. 3A as viewed along the direction of arrow C in FIG. 3A. Numeral 41R denotes a LED having a red light emission wavelength range, numeral 41G denotes a LED having a green light emission wavelength range, and numeral 41B denotes a LED having a blue light emission wavelength range. Note the light source is symmetric to the line connecting the center of 41R and the top point T of the curve as shown in FIG. 7, and so do 41G and 41B. In addition, 41G and 41B are also inter-changeable. When this light source is mounted to the light guide, this line that connects the center of 41R and the top point T of the curve as shown in FIG. 7, should be normal to the paint stripe 5 in FIGS. 3A and 3B. The placement of LED 41R, 41G and 41B, as shown in FIG. 6, proves to be the best LED placement that matches the present light guide design discussed herein. In addition, the light source and light guide fits best to the rest of the system if they are tilted toward target paper (at an angle 0 with perpendicular direction N as shown in FIG. 3B).

As shown in FIG. 5B, the wings 26 at the bottom of the mount tabs prevent the occurrence of an initial spike that may arise from too much light emitted from the Red LED hitting the paint stripe directly as the Red LED is placed on the normal line to the paint stripe. The notch 27 on the top prevents the curved illumination face from focusing light from the Green and Blue LEDs onto the paint stripe to eliminate the dip and spike effect. It should be noted that while the mounting tabs minimize spikes and dip at the start, the Red LED might lose some light initially. However, this is not a major problem because Red LEDs are much brighter than Green and Blue LEDs.

Figure 8A:
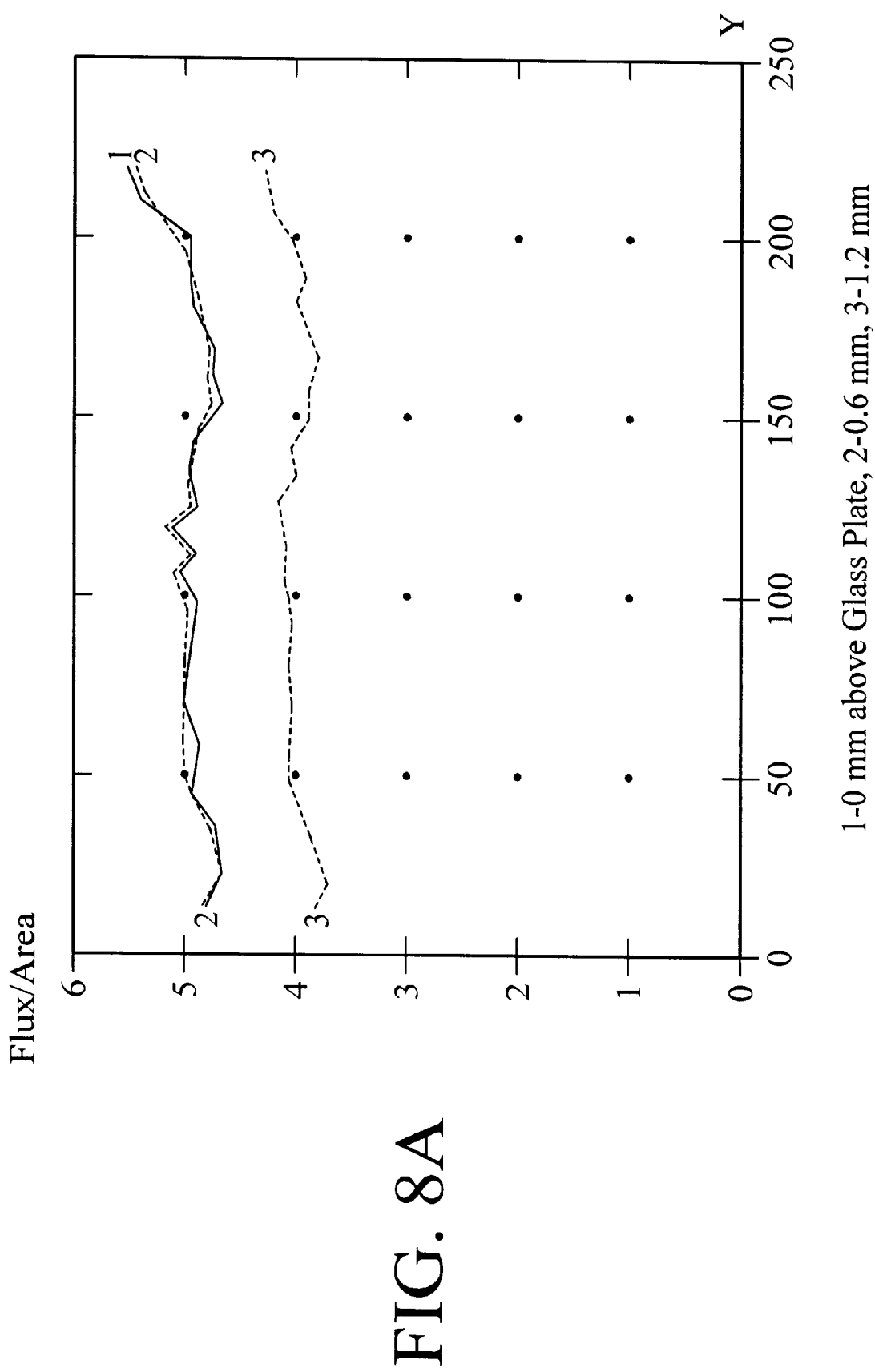
FIGS. 8A and 8B show the illumination patterns along the length by the Red LED and the Green and Blue LEDs according to the invention.
Figure 8B:
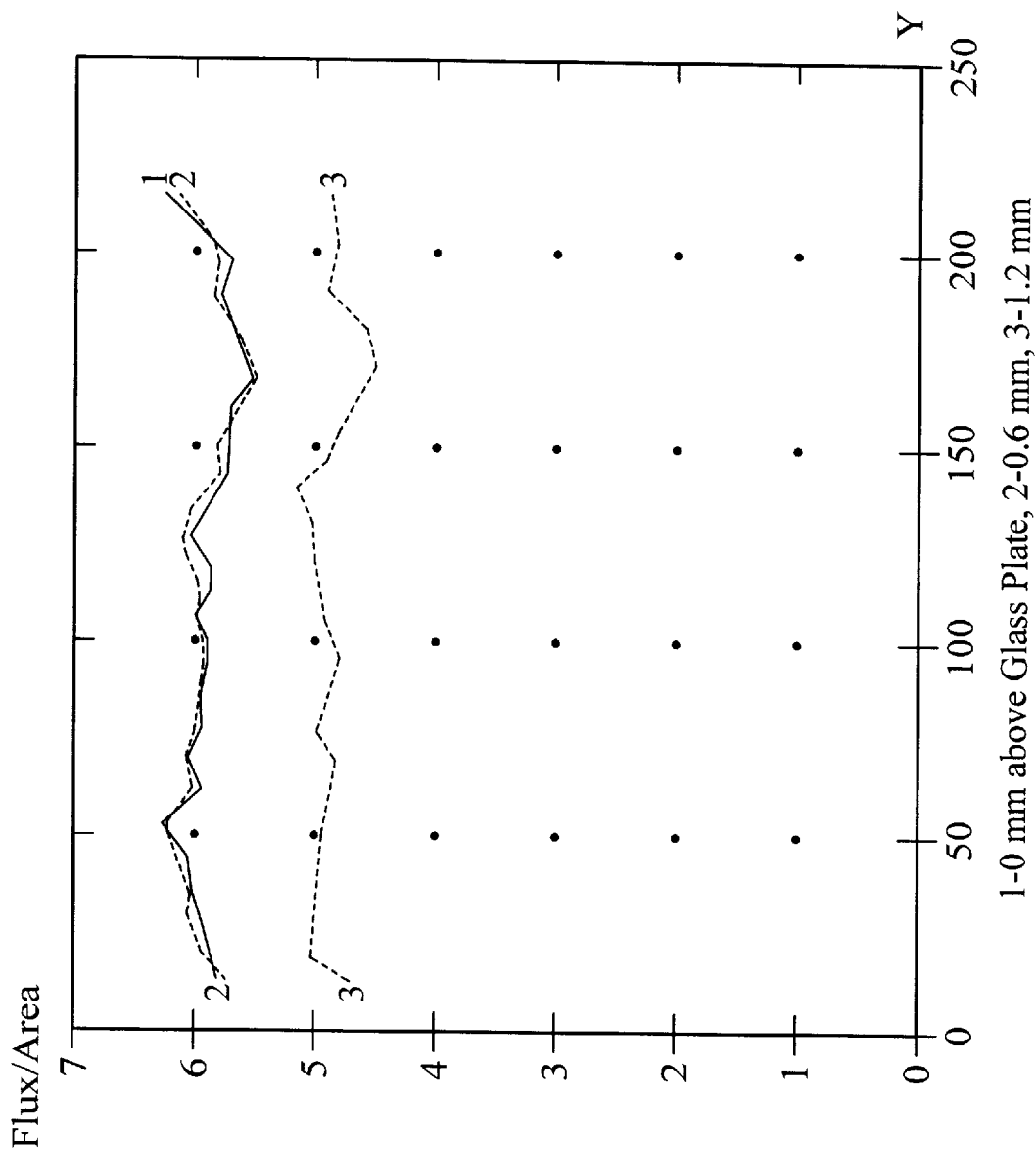

FIGS. 8A and 8B show the longitudinal illumination patterns performed by the Red LED and the Green and Blue LEDs according to the invention. It is evident that illumination uniformity along the cross-section of the light guide is demonstrated for both the Red LED and the Green and Blue LEDs. There are slight differences in the uniformity pattern with the Red LED as compared to the blue and green LEDs. The Red LED is less efficient, but its light output is still much greater than the prior art illumination device.

Although the preferred embodiment of the invention has been disclosed for illustrative purposes, those skilled in the art will appreciate that various modifications, additions and substitutions are possible, without departing from the scope and spirit of the invention, as disclosed in the accompanying claims.

What is claimed is:

1. An illumination device comprising:
   a light guide having a light reflective area and an opposing curved light exit area located on a face along the longitudinal direction of said light guide to receive a light beam;
   an illumination means comprising at least three light emitting elements of different light emission wavelength ranges and being arranged at an end of the light guide to emit the light beam through a light entrance at the end of the light guide adjacent to the illumination means; and
   a mounting means arranged adjacent to the light entrance to retard the light beam before it being reflected at said reflective area of said light guide;
   wherein at least a center of the three light emitting elements is placed along a normal line passing through a center of the reflection area when viewed in a longitudinal direction of said light guide.

2. An illumination device according to claim 1, wherein the light guide is in a rod-like shape having a substantially symmetric cross section to form a total internal reflection along its length.

3. An illumination device according to claim 1, wherein the curved light exit face provides a focused illumination onto a target original to form a narrow line thereof.

4. An illumination device according to claim 1, wherein the light guide further comprises a reflection means arranged at a second end of the light guide opposite to the illumination means.

5. An illumination device according to claim 4, wherein the reflection means is a separate component made of metal or white plastic.

6. An illumination device according to claim 2 wherein said reflection area of the light guide is formed by a light reflective paint along a longitudinal direction of the light guide.

7. An illumination device according to claim 6 wherein the paint density of the light reflective paint is higher where the location of said reflection area is farther away from the illumination means.

8. An illumination device according to claim 6 wherein the light beam reflected from the reflection area was redirected to the illumination face after reflecting on the total internal reflection sidewall to form a "virtual paint strip" on the sidewall as if they were emitted from an imaginary paint stripe and consequently the virtual width of the light reflective paint is much larger than its physical width to increase light intensity.

9. An illumination device according to claim 1, wherein the three light emitting elements emit a red light emission wavelength range, a green light wavelength range and a blue light wavelength range, respectively.

10. An illumination device according to claim 1, wherein the three light emitting elements are LEDs.

11. An illumination device according to claim 1, wherein the light emitting element that is placed along a normal line passing through a center of the reflection area is a red wavelength range.

12. An illumination device according to claim 1, wherein the light emitting elements of green light wavelength range and blue light wavelength range are preferably arranged symmetrically to the normal line passing through the center of the scatter and reflection area.

13. An illumination device according to claim 1, wherein the mounting means consists of mounting tabs having wings at the bottom thereof to prevent the occurrence of an initial spike that may arise from the light emitted from the Red LED.

14. An illumination device according to claim 13, wherein the mounting tabs further comprise a notch to prevent the curved light exit face from reflecting light from the Green and Blue LEDs onto a portion of the paint stripe to eliminate a stripe at the beginning of an illumination pattern.

15. An illumination device according to claim 1, wherein said illumination means and light guide are tilted toward an illumination target.

16. An illumination device comprising:
   a light guide having a light reflective area and an opposing curved light exit area located on a face along the longitudinal direction of said light guide to receive a light beam;
   an illumination means comprising a plurality of light emitting elements of different light emission wavelength ranges and being arranged at an end of the light guide to emit the light beam through a light entrance at the end of the light guide adjacent to the illumination means; and
   a mounting means arranged adjacent to the light entrance to retard the light beam before it being reflected at said reflective area of said light guide;
   wherein at least a center of the plurality of light emitting elements is placed along a normal line passing through a center of the reflection area when viewed in a longitudinal direction of said light guide.

17. An illumination device according to claim 16, wherein the curved light exit face provides a focused illumination onto a target original to form a narrow line thereof.

18. An illumination device according to claim 16, wherein the light emitting element that is placed along a normal line passing through a center of the reflection area is a red wavelength range.

19. An illumination device according to claim 16, wherein said illumination means and light guide are tilted toward an illumination target.

20. An illumination device according to claim 16, wherein the light guide further comprises a reflection means arranged at a second end of the light guide opposite to the illumination means.

21. An illumination device according to claim 20, wherein the reflection means is a separate component made of metal or white plastic.

22. An illumination device according to claim 16, wherein the plurality of light emitting elements emit at least a red light emission wavelength range, a green light wavelength range and a blue light wavelength range.

23. An illumination device according to claim 22, wherein the plurality of light emitting elements are LEDs.

24. An illumination device according to claim 16, wherein the mounting means consists of mounting tabs having wings at the bottom thereof to prevent the occurrence of an initial spike that may arise from the light emitted from the Red LED.

25. An illumination device according to claim 24, wherein the mounting tabs further comprise a notch to prevent the curved light exit face from reflecting light from the Green and Blue LEDs onto a portion of the paint stripe to eliminate a stripe at the beginning of an illumination pattern.

26. An illumination device according to claim 16, wherein the light guide is in a rod-like shape having a substantially symmetric cross section to form a total internal reflection along its length.

27. An illumination device according to claim 26 wherein said reflection area of the light guide is formed by a light reflective paint along a longitudinal direction of the light guide.

28. An illumination device according to claim 27 wherein the paint density of the light reflective paint is higher where the location of said reflection area is farther away from the illumination means.

29. An illumination device according to claim 27 wherein the light beam reflected from the reflection area was redirected to the illumination face after reflecting on the total internal reflection sidewall to form a "virtual paint strip" on the sidewall as if they were emitted from an imaginary paint stripe and consequently the virtual width of the light reflective paint is much larger than its physical width to increase light intensity.

* * * * *